United States Patent Office 3,809,669
Patented May 7, 1974

3,809,669
STABLE VINYL CHLORIDE POLYMER STRUCTURES AND METHOD OF PRODUCING THEM
Norman B. Rainer, 2008 Fon du Lac Road, Richmond, Va. 23229
No Drawing. Filed Feb. 11, 1972, Ser. No. 214,423
Int. Cl. C08f 27/02; C08j 1/14
U.S. Cl. 260—2.5 R      4 Claims

ABSTRACT OF THE DISCLOSURE

A polyvinyl chloride (PVC) structure is formed and then dehydrohalogenated to remove a substantial amount of the chlorine content. The dehydrohalogenated product becomes resistant to solvents normally capable of dissolving PVC and also becomes thermally stable and unmeltable at temperatures which would cause PVC to melt. The process is carried out by first heating a vinyl chloride polymer to the point of sintering to form a microporous polymer shaped structure or a relatively non-porous sheet, film, fiber or coating of the vinyl chloride polymer. The shaped structure is then dehydrohalogenated to remove about 10% to 80% of the chlorine content, resulting in a shaped polymeric structure that is both solvent and heat resistant.

BACKGROUND OF THE INVENTION

It is well known that polyvinyl chloride or copolymers in which vinyl chloride is a major constituent can be dehydrohalogenated to some degree. Accidental loss of hydrogen chloride can occur on excessive or extended heating of such polymers. Irradiation may also cause this effect. It is also known that experimental reactions have been carried out on polyvinyl chloride solutions or polymer in finely divided state which effect a material dehydrohalogenation of the polymer. However, in these cases, the operating conditions used are such that insolubilization and particle precipitation occur. In such cases, the resulting insoluble and precipitated particles are incapable of being shaped or formed into a coherent microporous structure, or formed into films or other desired shapes because of the complete intractability of the treated polymer.

It is an object of the present invention to prepare a polyvinyl chloride structure that is thermal and solvent resistant.

It is a further object of the invention to prepare a dehydrohalogenated microporous polyvinyl chloride structure that resists change of dimensions or deformation.

It is another object of the invention to prepare a dehydrohalogenated porous or non-porous vinyl chloride polymeric structure that is thermal and solvent resistant.

It is a still further object of the invention to prepare a dehydrohalogenated vinyl chloride polymeric structure by a method in which the product becomes resistant to solvents and to high temperature changes.

These and other objects will be clear from the description of the invention to follow.

DESCRIPTION OF THE INVENTION

This invention relates to novel polyvinyl chloride products and to methods for producing them. More particularly, the invention involves the preparation of vinyl chloride polymer structures that have been dehydrohalogenated.

Briefly describing the invention, polyvinyl chloride or a vinyl chloride copolymer in the form of a powder or as a latex is dispersed in a high boiling non-solvent liquid. The dispersion is deaerated and then heated while formed into a desired shape to solidify the polymer into a shaped structure. The latter is then treated with a basic liquid medium having a wetting effect but no solvent effect and when treating a microporous polymer little, if any, swelling effect on the polymer. The liquid may itself be basic (e.g., an amine) or it may contain a dissolved organic or inorganic base. Dehydrohalogenation of the polymeric structure takes place during its contact with the basic medium under conditions effecting a controlled removal of a portion of the halogen content from the polymer. Such treatment thus produces a formed structure either immediately ready for use or, if desired, for a later crushing or cutting step. The product, in its final form is now resistant to solvents that would normally dissolve the untreated polymer and substantially unmeltable at temperatures that would melt the untreated polymer.

In carrying out the invention, the polymer to be treated is a polyvinyl chloride resin. This term as used herein, is intended to include not only homopolymers consisting entirely of polymerized vinyl chloride, but also copolymers and interpolymers of at least 70% by weight of vinyl chloride and up to 30% by weight of one or more various other vinyl monomers copolymerizable with vinyl chloride. For the purpose of this invention the other vinyl monomers which may be included in addition to the essential vinyl chloride in the polyvinyl chloride resins are monoolefinically unsaturated monomers, particularly those having a $CH_2=C<$ grouping or a $—CH=CH—$ grouping.

Representative monoolefinically unsaturated monomers that may be used are the monoolefins such as ethylene, propylene, the butylenes, the amylenes, the hexylenes, cyclohexene and the like. Likewise, other vinyl halides such as vinyl bromide, vinylidene chloride, vinylidene bromide, 1,2-dichloroethylene, and the like are contemplated.

Another type of unsaturated monomer that can be used are the vinyl alkyl and aromatic esters such as vinyl acetate, vinyl propionate, vinyl butyrate, vinyl benzoate, isopropenyl acetate and the like; the allyl esters such as allyl acetate or allyl benzoate; the acrylate and methacrylate esters such as methyl acrylate, ethyl acrylate, propyl acrylate, isopropyl acrylate, the butyl acrylates, the amyl acrylates, the hexyl acrylates, phenyl acrylate, cyclohexyl acrylate, methyl methacrylate, ethyl methacrylate, the propyl methacrylates, the butyl methacrylates, the amyl methacrylates, the hexyl methacrylates, phenyl methacrylate, cyclohexyl methylacrylate and the like; the maleate and fumerate esters such as diethyl maleate, the dipropyl maleates, the dibutyl maleates, the diamyl maleates, dimethyl fumarate, diethyl fumarate, the dipropyl fumarates, the dibutyl fumarates, the diamyl fumarates, dicyclohexyl-fumarate, diphenyl fumarate and the like.

Still another type of unsaturated monomer that may be used are the vinyl aromatic monomers such as styrene, the vinyl toluenes, the vinyl xylenes, vinyl naphthalene, and the like.

Various monomeric unsaturated ethers may also be used such as vinyl methyl ether, vinyl ethyl ether, the vinyl propyl ethers, the vinyl butyl ethers, the vinyl amyl ethers, vinyl cyclohexyl ether, vinyl phenyl ether, vinyl benzyl ether, or the allyl ethers such as allyl methyl ether, allyl ethyl ether and the like. Additionally vinyl cyanides such as acrylonitrile, methacrylonitrile, and the like may be used as well as heterocyclic vinyl compounds such as N-vinylpyrrolidone and the vinylpyridines. All of these may be combined with a major amount of vinyl chloride to produce useful resins capable of forming into the desired structural form prior to dehydrohalogenation.

In accordance with one aspect of the invention, a microporous polymer structure is prepared by starting with either polyvinyl chloride agglomerates in the form of a powder or non-agglomerated polymer particles in latex form, i.e., an aqueous colloidal suspension of the polymer.

The polymeric material is formed into a shaped structure by a procedure fully described in U.S. patent application Ser. No. 62,647, filed Aug. 10, 1970, now U.S. Pat. No. 3,674,722 or in U.S. patent application Ser. No. 183,256, filed Sept. 23, 1971.

As described in these applications, the polymer or copolymer is highly dispersed either in the dry form or as a latex into a high boiling liquid which is a non-solvent for the polymer. The non-solvent may be glycerine or an aliphatic glycol of 2 or 6 carbon atoms. It should be mentioned that no plasticizer, softening or swelling agent is utilized in the dispersion mixtures described in the above-mentioned applications nor is any used in the process of the invention here.

The polymeric dispersion in the non-solvent if prepared from a powder form of polymer is deaerated before the mixture is heated or otherwise molded to the desired shape. In the case of dispersions derived from latexes, the dispersion is first dehydrated to a substantial degree, and deaeration is not required.

The shaping step is carried out on the deaerated or dehydrated dispersion by known polymer shaping procedures such as injection molding, extrusion, casting, sintering, thermoforming or other well known forming processes. The shaping or forming step causes the polymer particles to cohere together and to form into a microporous, microreticulated network having walls between the pores averaging about 2 to 60 microns in thickness and preferably averaging from 5 to 40 microns thick.

After the microporous product is formed, any non-solvent liquid remaining in the formed structure is removed by extraction or other means and if extraction liquid is present, such as water, the product is preferably dried before proceeding to a controlled dehydrohalogenation of the vinyl chloride polymeric structure.

The dehydrohalogenation of the polymeric structure is carried out by thorough contacting of the polymeric structure with, and preferably by, complete immersion of the structure into a basic liquid medium which either consists essentially of a basic liquid such as an organic amine, as for example, guanidine, or preferably, an alkali metal hydroxide or a quaternary ammonium hydroxide dissolved in a lower alkanol of about 1 to 4 carbon atoms. An alkali metal amide solubilized in liquid ammonia is also useful for dehydrohalogenating the vinyl chloride polymer.

As indicated before, the basic medium is selected to have a wetting effect but no solvent effect and preferably little if any swelling action on the microporous structure. Specific bases meeting these qualifications are, for example, sodium or potassium amide or hydroxide and benzyl trimethylammonium hydroxide. The preferred basic medium is potassium hydroxide in isopropanol.

In preparing the basic medium, when alcohol is used as the liquid vehicle, alkali metal hydroxide is added to the alcohol in an amount of about 4% to about 15% by weight. In the case of the quaternary ammonium hydroxide, this is solubilized in the alcohol in an amount of about 5% to 40% by weight. With regard to the amide in liquid ammonia, this is added in an amount of about 3% to 25% by weight. As a general rule, the proper basicity is obtained when the base is present in an amount in excess of the stoichiometric amount required to interact with the HCl to be removed from the polymer.

Halogen removal in the basic liquid medium may be carried out by heating the liquid from about 40° to 150° C. preferably 50° to 100° C. or to the refluxing temperature of the basic liquid medium for 1 to 6 hours. A pressurized system may be employed when a temperature is used which exceeds the normal boiling point of the basic medium. However, heating is not always necessary. If, for example, the polymeric object is immersed in a 40% alcoholic solution of benzyltrimethylammonium hydroxide, satisfactory dehydrohalogenation can be accomplished at room temperatures in 4 to 12 hours. The heating may be carried out in an open vessel or in a closed system.

The extent of halogen removal from the polyvinyl chloride is controlled to remove from about 10% to about 80% and preferably from 15% to 60% by weight of chlorine from the polymer. Such treatment will cause little or no change in the microporous geometry of the polymer structure or in the external surface area which will range from about 0.2 to 10 sq. meters per gram.

It must be emphasized that an important element in the dehydrohalogenation of microporous polymer structures is the nature of the polymer structure. One must start with a structure of vinyl chloride polymer particles or agglomerates that have been cohered or sintered together at their points of contact with neighboring particles or agglomerates. The agglomerates then constitute the "walls" of the pores. By employing polymer agglomerates of small size, e.g., under about 60 microns, the pore wall thickness will be thin enough to permit thorough penetration of the basic media. The porosity of the polymeric structure is important in determining whether the basic liquid medium will penetrate the microporous structure and, of course, the strength of the final structure. It has been found that the pore size should average in the range of about 1 to 40 microns or on an average pore volume basis, from 0.4 to 3.5 cc./gram. When the average pore size is below about 1 micron, penetration by the liquid is difficult, especially where thick structures are involved. When the average pore size is greater than about 40 microns, the structure will be found to possess too low a useful strength. Additionally, structures having a pore wall thickness greater than about 60 microns cannot easily be treated to achieve the stable product of the invention.

The upper portion of the thickness range may be used when the product is to be crushed or broken into particle sizes, for example, in producing cigaret filter material in particle size, or when particles are to be used as a packing in a gas chromatography column. As indicated, the pore wall thickness is important. The wall thickness should be greater than 2 microns in order to impart adequate strength to the structure, but should be less than about 60 microns to enable the basic liquid medium to penetrate and react with the polymer. Wall thicknesses below 60 microns are secured by employing dispersed polymer having particle sizes considerably below 60 microns, and employing concentrations of polymer in the structure-forming dispersion of less than 30%.

In one aspect of this invention, an open celled porous structure may be dehydrohalogenated only in selected regions and then treated with a good solvent for polyvinyl chloride, such as tetrahydrofuran, which removes the untreated polymer from the structure. Such treatment may be employed to increase surface area and pore volume of the structure. For example, a porous structure can be subjected to treatment with a basic medium in a manner such that the dehydrohalogenation reaction does not penetrate through all the polyvinylchloride of the cell wall. This is particularly well accomplished if the cell walls have thicknesses greater than about 40 microns either uniformly throughout the structure or in random portions thereof. In such case, following dehydrohalogenation, treatment with tetrahydrofuran removes unreacted polymer material from the interior of the relatively thick cell walls. This manner of treatment is particularly suitable in the case of the microporous structures produced as described supra by the thermal sintering of dispersed particles. Such structures generally have pore walls of randomly varying thicknesses. Even when the average wall thickness may be small, some portions may exist as large agglomerates having thicknesses in excess of 60 microns. By dehydrohalogenating and then extracting with tetrahydrofuran, these random thick regions are hollowed out, thereby creating a pore defined by the outer periphery of the previously thick section. Such treatment not only eliminates dead weight but creates greater porosity.

In the shaped and treated form, the microporous polymer structures can be used as battery separators, porous electrodes, Soxhlet extractor thimbles or other light weight shaped structures requiring good solvent and thermal resistance. Unlike untreated polyvinyl chloride, the process will produce a microporous product capable of functioning as an excellent absorbent for such substances as $NO_2$, $SO_2$, HCl or $H_2SO_4$, making it practical for the removal of undesired components from smoke stack gases. A noteworthy characteristic of the treated polymer is also in its ability to take up oxygen. Thus, the slow oxidative reactions of the material in the form of an electrode having a conductive core can be utilized for generating an E.M.F.

The treated polymer is also useful in the form of microporous granules where such granules may encounter the normal solvents capable of dissolving polyvinyl chloride or temperatures that would normally melt the untreated polymer. Thus, after the dehydrohalogenation process is carried out to remove the desired amount of chlorine, the microporous product, as indicated, becomes solvent and temperature stable. If it is then crushed or reduced to particle sizes the particles still have an open, porous structure. Such microporous particles are useful where solvents are to be filtered or purified, or where high temperatures are encountered, for example, as a column packing in gas chromatography apparatus, normally operating at temperatures up to about 200° C.

The dehydrohalogenating treatment normally results in a color product ranging from yellow, with slight dehydrohalogenation through brown and red to black with increased dehydrohalogenation and chlorine removal. It has been found that the product may be bleached, if this is desired, to a lighter color and even to white, using known bleaching agents such as $H_2O_2$ or $Ca(OCl)_2$.

While total immersion of the polymeric structure in the basic medium is generally the preferred operation where the entire structure is to be dehydrohalogenated it is also possible to treat only specific areas or surfaces of the polymeric structure with the basic medium, i.e. for purposes of lettering untreated polymer. The basic medium could be incorporated into a printing paste, for example, and the treated area will turn color as indicated before, changing from yellow to red to brown and finally to black depending on the amount of chlorine removed, the yellow coloring indicating about 5% chlorine removal, the red indicating a 5–15% chlorine removal and the darker shades to jet black indicating a greater than 15% chlorine loss.

In another embodiment of the invention, essentially non-porous polyvinyl chloride shaped structures such as films or fibers having thicknesses below 100 microns, and preferably below 60 microns or even substrates coated with a polyvinyl chloride resin produced in known manner may be rendered resistant to deformation and the solvents or temperatures that would normally affect untreated polymeric material. In carrying out this aspect of the invention the polyvinyl chloride film or other similar substantially non-porous polymeric material in non-plasticized form is immersed in an organic liquid that contains a swelling agent as well as an organic or inorganic alkaline agent. A preferred liquid is a lower alkanol of 1 to 4 carbon atoms such as isopropanol. The alkaline material may be either an alkali metal hydroxide, preferably potassium hydroxide or a quaternary ammonium hydroxide such as benzyl trimethylammonium hydroxide. The swelling agent may be, for example, benzene, toluene, xylene, acetophenone, cyclohexanone, diethyl ketone, benzyl alcohol, cyclohexanol, diethyl ether, aniline, phenyl hydrazine or tributyl phosphate. In general, the swelling agent is a liquid which is chemically resistant to strongly basic media. Additionally it may be a liquid which ether swells or dissolves polyvinyl chloride. A material which is a strong solvent for the resin may be modified to produce only a swelling action by dilution with compatible nonswelling liquid. In treating the film or other thin structure, while one may first swell the non-porous vinyl chloride polymer before subjecting it to the basic medium for dehydrohalogenation, it has been found preferable to immerse the untreated polymeric material in a bath of the basic medium containing the swelling agent. A preferred medium is methyl, ethyl or isopropyl alcohol in which is dissolved 5% to 15% by weight of alkali metal hydoxide and from 5% to 50% by weight of swelling agent. Depending on the length of the treatment in the basic medium, from 15% to 70% of chlorine may be removed.

It should be noted that the degree to which the alkaline-swelling agent mixture swells the polymeric structure is important. If the swelling action is insufficient, penetration of the alkali into the polyvinyl chloride material is retarded and the resultant product will not possess thermal or solvent resistance although surface coloration effects may still be obtainable if only the latter is desired. On the other hand, with too great a swelling effect, films or thin-shaped articles will distort and coatings may lose adhesion to the substrate. To achieve the proper degree of swelling, the time of treatment of the product subjected to the swelling agent-basic medium at the concentrations described above should be from about 30 minutes to 7 hours, with the time of treatment dependent on the amount and the strength of the swelling agent in the basic medium, the temperature of treatment, and the nature of circulation of the liquid medium in contact with the article. This can easily be determined by a simple test. The proper degree of swelling may also be determined by controlling the volume increase of the swelled structure. It has been found that such increase should measure not less than 20 to no more than 80 volume percent.

The results of such treatment to non-porous polyvinyl chloride coatings, fibers, films or other thin structures produces a new type of product having substantially the same dimensions and physical form even at temperatures of over 350° C., whereas untreated polyvinyl chloride polymers melt in the neighborhood of 210° C. In addition to its thermal stability the products are stable and relatively unaffected by solvents which would normally dissolve untreated polyvinyl chloride. For example, tetrahydrofuran, which is an excellent solvent for polyvinyl chloride, will exert only a minor swelling effect at most on treated products of this invention. The extent of swelling will in no case exceed 50%.

One good use for a non-plasticized vinyl chloride polymeric material cast as thin sheets and treated in the manner described is in electrical apparatus as insulation material. Another use is in ion-exchange apparatus and utilized as chemically resistant semi-permeable membranes. Thinner structures such as relatively thin films treated in the manner described would be useful as heat-proof coverings, for example, in ovens where the temperatures may range from 100° to 400° C. Dehydrohalogenated fibers may be woven into filtration cloth which would be utilized where high thermal stability was necessary or when solvents might attack untreated material.

The following examples are illustrative. Percentages are to be understood as given in a weight basis unless otherwise indicated.

EXAMPLE 1

A dispersion was made consisting of 20 parts microporous polyvinyl chloride powder of 1 micron average discrete size (sold under the trade name "Geon" 126 by Goodrich Chemical Co.) and 80 parts ethylene glycol, employing a Waring blendor operating at 15,000 r.p.m. for two minutes. The resultant dispersion was subjected to deaeration at a pressure of 0.5 mm. of mercury for about one hour at room temperature until emanation of volatiles (as evidenced by bubbling) ceased.

The deaerated dispersion was poured into a rod-shaped mold. The mold containing the dispersion was placed in an air circulating oven at 160° C. for 52 minutes. The product was sliced into wafers, washed and dried. The wafers had an average pore size of 10 microns and a total pore volume of 3.1 cc./g. The external surface area was about 1 sq. m./g. Some of the wafers were placed in a Carius tube and covered with saturated KOH in isopropanol. The tube was capped and placed upright in an oven at 85° C. overnight. The wafers when removed were dark red-brown and the liquid slightly yellow. Wafers were placed in tetrahydrofuran (THF), a good solvent for PVC; they swelled slightly but did not dissolve or distort. The THF-treated wafers were exposed to air and light, and in about two days turned almost white, perhaps from UV-induced oxidation since the parts not in direct light were slightly darker.

Some of the wafers taken directly from the KOH solution were treated again in the same way with fresh solution. They became only slightly darker. They were transferred with minimum air exposure to a large volume of deoxygenated (boiled) water and rinsed thoroughly, then vacuum dried. Analysis showed Cl, 24.1%; O, 8.3%. Since the chlorine content of the starting resin was 56%, about a 75% reduction in absolute chlorine content (stoichiometric) had been achieved.

Similar microporous PVC wafers were treated in KOH-saturated ethanol in a closed tube for about 64 hours at 65° C., left immersed about 48 hours at room temperature. They were dark brown-black. These were rinsed in running water overnight, then in isopropanol. The wafers were comminuted in a Waring blender and sieved to obtain porous 40/80 mesh granules. The granules were infusible and insoluble in tetrahydrofuran. The granules were found effective in filtering cigarette smoke.

EXAMPLE 2

A vinyl chloride dibutyl maleate copolymer powder (a copolymer of 85% vinyl chloride and 15% dibutyl maleate, sold under the trade name "Pliovic" AO-1 by Goodyear Chemical Co.) 100 g. was dispersed in 400 g. ethylene glycol by a Waring blender, deaerated and cured in closed tubes at 165° C. for 52 minutes. The resulting rods were sliced into wafers which were extracted in isopropanol, then dried. The wafers were immersed in KOH-saturated 95% ethanol in a Carius tube, which was loosely capped and heated in a 70° C. oven overnight. The wafers were jet black. Some of the wafers were washed overnight in running water, then immersed in isopropanol, which developed a yellow color and this persisted after continuous extraction by warm isopropanol for 60 hours. The exterior was light reddish-tan, the interior black. After six days' exposure to air and light, the exterior was light yellow, the interior slightly darker. The external surface area was about 1.5 sq. m./gram. Analysis of the powdered vacuum dried product showed Cl, 39.01% and O, 10.07%. The initial resin contained 48.3% chlorine. The absolute chlorine content reduction (calculated stoichiometrically) was therefore about 32%.

The product of Examples 1 and 2, when molded in conical form of a size normally provided for cigarettes, removed a greater percentage of TPM than a similar filter of the same dimensions made of untreated polymer. In granular form (40/80 mesh) and loaded into a plug-space-plug filter, the product of Example 1 gave a 74% TPM reduction as compared to 62% of TPM reduction for an untreated granular polyvinyl chloride filter.

Other wafers from the KOH treatment (Example 2) were treated a second time in the same way. They were extracted with tetrahydrofuran in a Soxhlet unit 8 hours, air-dried 72 hours. Pyrolysis under a stream of nitrogen according to the following schedule:

| | Hours |
|---|---|
| 200° C. | 1 |
| 250° C. | 1 |
| 300° C. | 3 |
| 350° C. | 2 |
| 400° C. | 4 | resulted in the collection of some dark liquid distillate at the last stages, but the wafers did not melt, though turning dark brown. While the microporous geometry remained the same, the total surface area by BET measurement was found to be 91.33 m.$^2$/g. The high surface area material is essentially a microporous carbon, useful in the absorption of substances from liquids and gases.

EXAMPLE 3

A rod of microporous vinyl chloride-dibutyl maleate copolymer was made from resin latex (sold under the trade name "Pliovic" 300 by Goodyear Chemical Co.) by the method as follows:

200 g. of glycerine was mixed with good agitation into 97.7 g. of a 50% solids latex of Pliovic 300. This mixture was dehydrated by adding one drop at a time into a 4-liter flask maintained at a pressure of 1 mm. Hg. and immersed in a hot water bath at 60° C. The mixture was then placed in a vacuum desiccator over $P_2O$ overnight. The water analysis showed a 5.9% $H_2O$ content.

The dispersion, about 20% solids, was filtered into a 162 ml. mold of elongated shape. The filtering was done to remove any gels which may have formed during dehydration. Then, in the mold, the dispersion was deaerated by pulling a vacuum on it to remove air bubbles. The mold was placed in an air-circulating oven at 150° C. for 45 minutes. The mold was then removed and allowed to cool. The molded article showed no sign of thermal decomposition. It had shrunk approximately ½ inch and the exuded glycerine was clear. There were no visible surface defects. The material was diced, washed in tap water, extracted continuously for 8 hours with isopropanol, and then dried. The material was found to have a 3-micron average pore size, a pore volume of 3.1 cc./g., and an approximate wall thickness of 10 microns.

Solutions of 1%, 5%, and 10% KOH in isopropanol were prepared. Each was used to treat chips of the extracted material for 16 hours at 50° C. All chips were structurally intact; increasing amounts of sediment appeared with increasing solution concentration, and the chips at 5% and 10% were darker red-brown than at 1%.

Chips from 5% solution treatment were rinsed, placed in 10% solution for the same treatment, extracted for 6 hours with water, then with isopropanol. Analysis after vacuum drying/$P_2O_5$: Cl, 27.14%; O, 12.65%. The surface area was 8.76 m.$^2$/g.

The three different treatments of Example 3 produced different degrees of dehydrohalogenation. The product of the 1% KOH solution was found to exhibit only marginally less swelling in acetone than the untreated starting material. The product of the 5% treatment exhibited an acceptable resistance to swelling in acetone and the product of the 10% treatment was superior in that it demonstrated little swelling in acetone.

EXAMPLE 4

Microporous PVC as used in Example 2 was treated at room temperature with 40% methanolic solution of benzyltrimethylammonium hydroxide. In an hour the chip had turned brown; after 16 hours it was black. It was removed, rinsed, and cut open to show that the black was uniform through the chip.

EXAMPLE 5

Microporous PVC rods had been prepared with 15% (solids weight basis) conductive graphite in the dispersion before sintering. The rods were steeped in KOH-saturated ethanol in sealed tubes for 4 days at about 63° C. One rod, water-washed and dried, with dimensions ¼″ d. x 3″ l. had a resisitivity of 750,000 ohms. A No. 30 copper wire was inserted along the axis of the rod and connected by copper wire through a voltmeter and ammeter to a copper strip. The strip was immersed in saturated aqueous copper sulfate. The graphite-PVC electrode was immersed in concentrated aqueous $KMnO_4$ in an "Alundum" thimble which was placed in the $CuSO_4$ solution. The meters registered 0.18 volt and 0.83 milliamp. When the same arrangement was set up with KOH pellets added to the $KMnO_4$ solution to increase the basicity, the readings were 0.4 volt and 10.0 milliamps. The PVC electrode was the cathode in both cells.

EXAMPLE 6

A piece of unplasticized PVC film of 1.2-mil thickness (a product of the Polytherm Kassel Corp. of Englewood, N.J., and designated UG 30/010) was boiled in an Erlenmeyer flask containing a saturated solution of KOH in isopropanol. After 3 hours of boilings, the film, then dark brown in color, was removed and washed with boiling water, then washed with isopropanol, and dried. The dry film was contacted with cold tetrahydrofuran. The film immediately distintegrated. This is an indication that the chemical treatment did not thoroughly penetrate the film. the film.

The experiment was repeated with the exception that an equal volume of benzene, a swelling agent for PVC, was added to the isopropanol solution saturated with KOH. The resultant treated film was found to have the same color as the previously treated film but was unaffected by immersion in tetrahydrofuran. When tested for thermal stability, it was found that the film would not melt or distort at temperatures as high as 500° C. At temperatures above 500° C., a gradual carbonization occurred but still without apparent change in film size or shape.

The invention claimed is:

1. A shaped microporous polyvinyl chloride product resistant to deformation comprising a dehydrohalogenated microporous vinyl chloride polymer having an average cell wall thickness of about 2 to about 60 microns, said dehydrohalogenated vinyl chloride polymer being substantially insoluble in polyvinyl chloride solvents and unmeltable at temperatures up to 400° C.

2. The product of claim 1, wherein the dehydrohalogenated polymer is depleted of from about 10% to about 80% by weight of its original chlorine content.

3. The product of claim 1, wherein dehydrohalogenated polymer is microporous with pore sizes of about 1 to about 40 microns and a pore volume of about 0.4 to about 3.5 cc./gram.

4. The product of claim 3, wherein the dehydrohalogenated polymer has an external surface area of from 0.2 to 10 square meters per gram.

References Cited
UNITED STATES PATENTS

| | | | |
|---|---|---|---|
| 2,606,177 | 8/1952 | Downing | 260—891 |
| 3,576,914 | 4/1971 | Donat | 260—92.8 A |

MURRAY TILLMAN, Primary Examiner

NORTON FOELAK, Assistant Examiner

U.S. Cl. X.R.

260—78.5 CL, 85.5 XA, 86.3, 87.1, 87.5 C, 87.5 R